United States Patent [19]

Mahlmann

[11] 3,873,746
[45] Mar. 25, 1975

[54] PROCESS FOR AROMATIZING COFFEE
[75] Inventor: James P. Mahlmann, Wayne, N.J.
[73] Assignee: General Foods Corporation, White Plains, N.Y.
[22] Filed: Oct. 5, 1972
[21] Appl. No.: 295,316

[52] U.S. Cl.................. 426/319, 426/65, 426/366, 426/386
[51] Int. Cl................................................ A23 1/04
[58] Field of Search ........... 426/319, 366, 221, 222, 426/312, 386, 366, 387, 388, 318, 65, 193

[56] References Cited
UNITED STATES PATENTS

| | | | |
|---|---|---|---|
| 1,696,419 | 12/1928 | Staudinger | 426/366 |
| 2,557,294 | 6/1951 | Kellogg | 426/366 |
| 2,588,922 | 3/1952 | Haney | 426/366 X |
| 2,738,276 | 3/1956 | Blench | 426/312 |
| 2,807,547 | 9/1957 | Nickol | 426/312 |
| 3,035,918 | 5/1962 | Sorgenti | 426/388 X |
| 3,181,952 | 5/1965 | Mastrangelo | 426/318 |
| 3,244,533 | 4/1966 | Clinton | 426/388 X |
| 3,418,134 | 12/1968 | Rooker | 426/386 |
| 3,540,889 | 11/1970 | Clinton | 426/366 |
| 3,554,761 | 1/1971 | Carbonell | 426/386 X |
| 3,660,115 | 5/1972 | Revie | 426/221 X |
| 3,765,904 | 10/1973 | de Roissart | 426/386 X |
| 3,769,032 | 10/1973 | Lubsen | 426/386 X |

OTHER PUBLICATIONS

"Soluble Coffee Manufacturing Processes," by N. Pintauro, 1969, published by Noyes Development Corp.

Primary Examiner—Frank W. Lutter
Assistant Examiner—Neil F. Greenblum
Attorney, Agent, or Firm—Bruno P. Struzzi; Gerald E. Jacobs; William J. Speranza

[57] ABSTRACT

A novel process for producing aromatized coffee is disclosed, comprising obtaining a synthetic coffee aroma composition produced by reacting methyl mercaptan with a molar excess of carbonyl compounds, subjecting the composition to an evaporative process, and adding at least a portion of the evaporate to a coffee product. The coffee product may be either a soluble coffee product or roasted and ground coffee.

2 Claims, No Drawings

PROCESS FOR AROMATIZING COFFEE

BACKGROUND OF THE INVENTION

This invention relates to coffee and more particularly to a method of aromatizing a coffee product.

It is well-known among those skilled in the coffee art that soluble coffee, due to the extraction, concentration, and drying processes and conditions normally employed, lacks to varying degrees the characteristic aroma found in fresh roasted and ground coffee. The prior art is replete with various methods for improving the aroma in soluble coffee products. Less stringent extraction conditions and lower temperature drying methods, such as freeze-drying, have been used in an effort to retain the aromatic constituents found in the fresh roasted and ground coffee product. Other methods are generally directed at capturing these aromatic constituents before they are lost and subsequently reincorporating them into either soluble coffee extract or the final soluble coffee powder. Examples of such techniques are steam distillation of roast and ground coffee, plating with coffee oil expressed from roasted and ground coffee, and other like methods. Problems experienced with the stability of such aromatic fractions and the cost and difficulty of obtaining and employing them have led to efforts to prepare a wholly synthetic coffee aroma. Due to the chemical complexity of the natural coffee aroma found in roasted and ground coffee, however, synthetic coffee aromas generally fail to match the characteristic natural aroma of fresh coffee. More particularly, these synthetic coffee aromas generally are found to impart a strong, undesirable chemical taste to the resulting coffee product.

Efforts have also been made to improve the aroma of roasted and ground coffee using synthetic coffee aroma compositions, particularly roasted and ground coffee employing low quality bean types and decaffeinated roasted and ground coffee. The above-mentioned deficiencies discussed with respect to soluble coffee have also accompanied these roasted and ground coffee aromatization techniques.

SUMMARY OF THE INVENTION

It is accordingly an object of this invention to prepare an aromatized coffee by employing a synthetic coffee aroma, without imparting chemical off-tastes to the coffee product.

A more specific object of this invention is to prepare an aromatized soluble coffee using a synthetic coffee aroma without imparting chemical off-tastes to the soluble coffee product and thereby more closely approximating the natural aroma of coffee.

Another object of this invention is to improve the aroma and flavor of roasted and ground coffee using a synthetic coffee aroma.

It has been discovered that these and other objects are achievable by first obtaining a synthetic coffee aroma composition produced by reacting methyl mercaptan with a molar excess of carbonyl compounds, subjecting the composition to an evaporative process, and adding at least a portion of the evaporate to a coffee product. When applied to a soluble coffee product, the flavor and aroma of the soluble coffee product so prepared is found to more closely resemble that of roasted and ground coffee and is further found to display a noticeable lack of chemical off-tastes.

By "synthetic coffee aroma composition" is meant an aroma composition prepared by mixing chemical constituents in suitable proportions to result in a composition resembling the natural aroma of roasted coffee. Generally, though not necessarily, the chemicals mixed are certain of those found to exist in the aroma given off by fresh roasted and ground coffee as determined from chromatographic analysis. However, compounds not found in coffee aroma but structurally and chemically similar may also be employed. By varying the constituents and their proportions in the mixture it is possible to approximate the natural coffee aroma. Natural coffee aroma is generally descriptive of the aroma given off by fresh roasted and ground coffee. While it is appreciated that not any mixture of chemical constituents successfully approximates natural coffee aroma, it is an important finding of this invention that even less-than-optimally formulated mixtures may be improved substantially by use of the process of this invention.

The synthetic coffee aroma compositions found suitable for processing according to this invention are those prepared by reacting methyl mercaptan with a molar excess of carbonyl compounds. Examples of such reaction mixtures may be found in U.S. Pat. No. 1,696,419 and commonly-assigned U.S. Ser. No. 258,961, filed June 27, 1972, which is a continuation of U.S. Ser. No. 18,296, now abandoned.

Once the synthetic coffee aroma composition has been formulated, it is subjected to an evaporative process to vaporize substantially all of the chemical mixture. The conditions under which evaporation is achieved varies, of course, with the specific formulation employed and is simply a matter of routine experimentation. The evaporation of the composition may be achieved through any of a variety of methods such as vacuum evaporation, distillation, or the like. The atmosphere for evaporation or distillation may be air, nitrogen, carbon dioxide, or other like mediums.

The evaporate from the above process is added to a coffee product at some predetermined level which varies according to the formulation employed, individual preference, the type coffee product employed, and other like considerations. The coffee product may be a soluble coffee product or roasted and ground coffee. In either case, the coffees may be decaffeinated or undecaffeinated. The soluble coffee product may be soluble coffee extract or dried soluble coffee powder prepared therefrom. Where the coffee product for addition is dried powder, one may first collect and condense the synthetic coffee aroma composition vapors with a subsequent addition of a portion the condensate to the soluble coffee powder. In alternate embodiment of this invention, the evaporative vapors are contacted directly with soluble coffee powder which is preferably chilled to below 0°C, and more preferably, to a coffee powder which has been sprayed with a liquid glyceride such as coffee oil. Again, it is desirable that the powder be chilled. Similarly, where the coffee product is soluble coffee extract, a condensate from the vaporized coffee aroma composition may be added directly to the extract. In our preferred means of operation, however, it is desirable to evaporate the synthetic coffee aroma composition directly into the coffee extract to be aromatized. In either case, when addition is made to an extract it is preferred to form the final soluble coffee powder by drying the extract using the lowest possible temperatures such as by low-temperature spray drying or freeze-drying.

When applied to roasted and ground coffee, the evaporation vapors of the synthetic aroma composition may be contacted directly with roasted and ground coffee. It may be preferable to chill the roasted and ground coffee prior to its being contacted with the evaporative vapors.

DETAILED DESCRIPTION OF THE INVENTION

As noted previously, the synthetic coffee aroma compositions processed according to this invention are those produced by reacting methyl mercaptan with a molar excess of carbonyl compounds. The final reaction mixture contains hemi-mercaptals and hemi-mercaptols.

The carbonyl compounds generally may comprise a mixture of acetone, acetaldehyde, butyraldehyde, lower alkane $\alpha$-diketone, and other like compounds. Examples of the $\alpha$-diketones are 2,3-butanedione, 2,3-pentanedione and the like, and mixtures thereof. Other additives may optionally be included such as pyridine, dimethyl sulfide, isovaleraldehyde, and the like.

Since free methyl mercaptan has a foul aroma, a molar excess of carbonyl compounds are employed. The proportions of the compounds in the entire reaction mixture are not critical, per se, so long as the molar excess is retained. As previously mentioned, it is an important finding of this invention that even less-than-optimally formulated synthetic aroma compositions may be improved according to the process of this invention.

The chemical constituents which make up the aroma composition are mixed in the desired proportions in the liquid state. Evaporation of the synthetic coffee aroma composition is then accomplished by subjecting the composition to temperatures and pressures sufficient to vaporize the liquid constituents. Such conditions may vary widely according to the particular components of the synthetic composition. It is obvious, of course, that, being an equilibrium operation, there are enumerable equivalent vaporization conditions which may be used simply by varying the temperature and pressure of the evaporative process. Thus, pressures up to 1000 pounds per square inch and greater may be used merely by raising the temperature of the mixture. Extremely low temperatures and vacuum operation may be employed. As a general consideration it is preferred to keep temperatures near room temperature. At such conditions the mixture may be evaporated directly from the vessel in which it is prepared, while operation under high pressures and temperatures requires suitable high pressure cylinders and the like.

The evaporation may be carried out in any suitable atmosphere but it is preferred to evaporate in an oxygen purged atmosphere to avoid oxidation of any of the chemical constituents of the composition. Thus nitrogen, carbon dioxide, or the like are preferred.

The evaporation process is continued until substantially all of the composition is volatilized or evaporated. By "substantially all" of the composition is meant merely to evaporate as much as possible of the synthetic aroma composition. Thus, the possibility of a slight, unvolatilized residue remaining is intended to be included in such terminology. The evaporative step, however, is to be distinguished from a mere fractionation step whereby only a portion of the composition is utilized. The final evaporate according to this invention may, however, chemically differ from the original mixture due to reformulation and/or reactions in the vapor state and unavoidable vapor losses. Depending upon the conditions of pressure and temperature employed, the evaporation may be achieved anywhere from a few minutes to over two hours. The evaporate from the above process are then added to a soluble coffee product.

The evaporate may first be condensed and collected using some suitable method such as collection in an ice bath or as a frost on liquid nitrogen traps. In one embodiment of this invention, the condensate is added to coffee extract which is subsequently dried, preferably using low-temperature spray-drying or freeze-drying techniques so as to minimize aromatic losses. Alternatively, the condensate may be added to soluble coffee powder using plating techniques.

In another embodiment of this invention, the evaporative vapors are not condensed but are contacted directly with a soluble coffee product. Thus, the vapors volatilized from the synthetic aroma composition may be contacted directly with soluble coffee powder. When operating in this manner it is desirable to chill the powder, preferably to below about 0°C. The vapors may also be contacted with soluble coffee powder which has been plated with a liquid glyceride, such as coffee oil. Again, chilling of the powder is preferred.

In a similar embodiment of this invention, but using roasted and ground coffee, the evaporative vapors are contacted directly with roasted and ground coffee. This may be accomplished using a moving bed of roasted and ground coffee and passing the evaporative vapors onto the bed. Again, it may be preferable to chill the roasted and ground coffee prior to contacting it with the synthetic coffee aroma vapors.

In an alternate, and preferred embodiment using a soluble coffee product, the vapors volatilized from the synthetic aroma composition are bubbled directly into a soluble coffee extract before it is dried. It is believed that such methods result in a certain amount of solubilizing and/or hydrolysis of the vapors in the extract and generally results in a more nearly roasted and ground flavor being imparted to the soluble coffee.

The amount of the synthetic aroma composition added to the coffee product is necessarily dependent upon the formulation of the mixture, the type coffee product employed, the extract concentration and drying method to be employed when soluble coffee is being aromatized, and the like. In the case of adding the synthetic composition in the form of a collected condensate, one may vaporize, condense and collect any amount of the mixture and merely add the desired level of the composition to the coffee product. When adding the vapors directly into a soluble coffee extract, however, since the entire synthetic composition is subjected to the evaporative process it is necessary to evaporate only the amount desired to be present in the final extract. In general, the volatilized synthetic aroma composition is added to a soluble coffee product at levels such that about 0.1 to 10 mg of the reaction mixture are found in a cup of soluble coffee having 1.35% soluble coffee solids by weight.

The aromatized soluble coffee product may be used separately or may be mixed with unaromatized soluble coffee products. For example, it may be desirable to evaporate the synthetic coffee aroma vapors into a soluble coffee extract which is subsequently freeze-dried and then to mix this dried product with another dried soluble coffee product which has not been aromatized and which may in fact be deficient in coffee aroma volatiles.

The following examples will serve to more fully illustrate the process of this invention.

EXAMPLE I

A synthetic coffee aroma composition was prepared by mixing the following ingredients in a chilled flask.

|  | Wt. Percent |
|---|---|
| Acetone | 32.656 |
| Acetaldehyde | 42.174 |
| Isobutyaldehyde | 1.384 |
| Isovaleraldehyde | 3.417 |
| 2,3 Butanedione | 8.544 |
| -Methyl Mercaptan | 3.383 |
| Methyl Sulfide | 8.117 |
| -Pyridine | 0.325 |

Two milliliters of the above mixture was introduced into a pre-chilled distilling flask. Into a receiving flask vented to atmosphere was placed 200 milliliters of soluble coffee extract having a soluble solids concentration of 25% by weight. The flasks were connected by glass tubing. Nitrogen gas below 1 psi was swept directly over the synthetic liquid aroma composition which was kept at room temperature. The vapors from the composition were carried with the nitrogen gas and slowly bubbled directly into the coffee extract. After two hours substantially all of the liquid composition had volatilized.

The following samples were then prepared:

1. Control — 3.2 grams of soluble coffee powder with 8 oz of hot water to result in a brew solids concentration of 1.35%.

2. As 1 above with 32 microliters of the above-mentioned liquid synthetic aroma composition added.

3. 2.4 grams of soluble coffee powder with 8 oz of hot water, with 0.8 grams of the extract treated with the synthetic aroma vapors added thereto resulting in a brew solids concentration of 1.35%.

Flavor evaluation by an expert panel of tasters found Sample 2 to be strongly synthetic with objectionable chemical offflavors. Sample 3 was judged to be more natural and aromatic than the control with a complete absence of chemical off-tastes.

EXAMPLE II

Fourteen milliliters of the synthetic liquid coffee aroma composition from Example I were placed in a pressure cylinder with 500 grams of dry ice. The cylinder and contents were brought to room temperature. Coffee extract of 25% solids concentration was placed in a separatory funnel and tygon tubing was used to connect the bottom of the funnel to the pressure cylinder. The pressure in the cylinder was 640 psig. The cylinder valve was then opened and gas plus the synthetic composition vapors were allowed to bubble through the extract. After 5 minutes, a sample of the extract was diluted to 1.35% coffee solids and expert tasters indicated a lack of chemical or artificial flavor notes.

EXAMPLE III

The synthetic aroma composition of Example I is volatilized according to the procedure of Example I. The vapors are retained in a vessel until substantially all of the aroma composition is volatilized. The collected vapors are then transferred to a bed of soluble coffee powder plated with 1.0% coffee oil by weight and chilled to about −40°C such that the vapors are absorbed onto the plated powder.

While this invention has been described with respect to the specific examples set forth above, they are intended to be illustrative only. Various modifications of the process described above are believed ascertainable to those skilled-in-the-art without departing from the scope and spirit of this invention.

I claim:

1. A process for aromatizing soluble coffee, comprising:
   a. obtaining a synthetic coffee aroma composition produced by reacting methyl mercaptan with a molar excess of carbonyl compounds;
   b. subjecting said composition to an evaporative process to volatilize substantially all of said composition;
   c. bubbling the vapors from said composition directly into a coffee extract; and
   d. drying said aromatized extract.

2. The process of claim 1 wherein said extract is freeze-dried.

* * * * *